United States Patent
Kim

(10) Patent No.: US 10,860,992 B2
(45) Date of Patent: Dec. 8, 2020

(54) METHOD OF REMITTING/RECEIVING PAYMENT USING MESSENGER SERVER

(71) Applicant: Zae Young Kim, Seoul (KR)

(72) Inventor: Zae Young Kim, Seoul (KR)

(73) Assignees: Zae Young Kim, Seoul (KR); Spinor Media Inc., Seoul (KR)

( * ) Notice: Subject to any disclaimer, the term of this patent is extended or adjusted under 35 U.S.C. 154(b) by 170 days.

(21) Appl. No.: 15/770,415

(22) PCT Filed: Nov. 4, 2016

(86) PCT No.: PCT/KR2016/012627
§ 371 (c)(1),
(2) Date: Apr. 23, 2018

(87) PCT Pub. No.: WO2017/078446
PCT Pub. Date: May 11, 2017

(65) Prior Publication Data
US 2018/0315029 A1    Nov. 1, 2018

(30) Foreign Application Priority Data
Nov. 4, 2015   (KR) .................. 10-2015-0154269

(51) Int. Cl.
*G06Q 20/10*   (2012.01)
*G06Q 40/02*   (2012.01)
(Continued)

(52) U.S. Cl.
CPC .......... *G06Q 20/102* (2013.01); *G06Q 20/02* (2013.01); *G06Q 20/14* (2013.01); *G06Q 20/16* (2013.01);
(Continued)

(58) Field of Classification Search
CPC ........ G06Q 20/10; G06Q 20/32; G06Q 20/40; G06Q 20/405; G06Q 20/102; G06Q 20/20;
(Continued)

(56) References Cited

U.S. PATENT DOCUMENTS 6,044,352 A * 3/2000 Deavers ................. G06Q 40/04
705/1.1
7,313,543 B1 * 12/2007 Crane ..................... G06Q 20/02
705/35

(Continued)

FOREIGN PATENT DOCUMENTS

JP     2002-157631 A    5/2002
KR   10-2002-0007973 A  1/2002
(Continued)

*Primary Examiner* — Alexander G Kalinowski
*Assistant Examiner* — Sanjeev Malhotra
(74) *Attorney, Agent, or Firm* — Dinsmore & Shohl LLP; Yongsok Choi, Esq.

(57) ABSTRACT

A method of remitting/receiving payments using a messenger server, which enables a messenger server to be accessed even without the involvement of a card value added network (VAN)/payment gateway (PG) company, enables a payment remitter to specify in advance the times that payments of funds are to be executed, and enables payments to be made according to payment receiving information on a payment recipient, from payment remittance information desired by the payment remitter.

16 Claims, 8 Drawing Sheets

(51) Int. Cl.
  *H04L 29/06* (2006.01)
  *H04L 9/32* (2006.01)
  *G06Q 20/02* (2012.01)
  *G06Q 20/14* (2012.01)
  *G06Q 20/22* (2012.01)
  *G06Q 20/40* (2012.01)
  *G06Q 30/06* (2012.01)
  *H04W 12/06* (2009.01)
  *G06Q 20/16* (2012.01)
  *H04L 29/08* (2006.01)

(52) U.S. Cl.
  CPC ......... *G06Q 20/227* (2013.01); *G06Q 20/401* (2013.01); *G06Q 30/0601* (2013.01); *G06Q 40/02* (2013.01); *H04L 9/3226* (2013.01); *H04L 63/083* (2013.01); *H04L 67/20* (2013.01); *H04W 12/0608* (2019.01); *H04L 2209/56* (2013.01)

(58) Field of Classification Search
  CPC ...... G06Q 20/02; G06Q 20/36; G06Q 20/401; G06Q 30/04; G06Q 20/04; G06Q 20/3223; G06Q 20/3224; G06Q 20/42; G06Q 40/02; G06Q 10/02; G06Q 20/108; G06Q 20/14; G06Q 20/322; G06Q 20/3274; G06Q 20/3278; G06Q 20/34; G06Q 20/352; G06Q 20/363; G06Q 20/4014; G06Q 20/4016; G06Q 40/00; G06Q 40/08
  USPC ........ 705/1.1, 4, 5, 17, 21, 35, 36 R, 39, 40, 705/41, 43, 44, 67; 235/379
  See application file for complete search history.

(56) References Cited

U.S. PATENT DOCUMENTS

| | | | | |
|---|---|---|---|---|
| 2003/0212633 A1* | 11/2003 | Senda | G06Q 30/04 | 705/40 |
| 2005/0114262 A1* | 5/2005 | Howard | G06Q 20/42 | 705/40 |
| 2005/0256747 A1* | 11/2005 | Hellrigel | G06Q 20/4016 | 705/4 |
| 2008/0052091 A1* | 2/2008 | Vawter | G06Q 40/02 | 705/39 |
| 2008/0154791 A1* | 6/2008 | Bannister | G06Q 40/025 | 705/36 R |
| 2008/0210751 A1* | 9/2008 | Kim | G06Q 40/02 | 235/379 |
| 2008/0228642 A1* | 9/2008 | Kim | G06Q 20/102 | 705/40 |
| 2010/0241566 A1* | 9/2010 | Kim | G06Q 20/04 | 705/44 |
| 2011/0202466 A1* | 8/2011 | Carter | G06Q 20/20 | 705/67 |
| 2012/0101859 A1* | 4/2012 | Boulton | G06Q 10/02 | 705/5 |
| 2012/0101943 A1* | 4/2012 | Park | G06Q 20/105 | 705/41 |
| 2012/0209762 A1* | 8/2012 | Metaireau | G06Q 20/32 | 705/39 |
| 2012/0310834 A1* | 12/2012 | Tamagawa | G06Q 20/14 | 705/44 |
| 2013/0066774 A1* | 3/2013 | Li | G06Q 40/125 | 705/40 |
| 2013/0151408 A1* | 6/2013 | Hill | G06Q 20/10 | 705/43 |
| 2014/0032415 A1* | 1/2014 | Lee | G06Q 20/20 | 705/44 |
| 2014/0089180 A1* | 3/2014 | Park | G06Q 30/06 | 705/40 |
| 2014/0195363 A1* | 7/2014 | Van | G06Q 20/3224 | 705/21 |
| 2014/0214664 A1* | 7/2014 | Kim | G06Q 20/10 | 705/41 |
| 2014/0244319 A1* | 8/2014 | Franklin | G06Q 10/02 | 705/5 |
| 2015/0142658 A1* | 5/2015 | Li | G06Q 20/32 | 705/44 |
| 2015/0178726 A1* | 6/2015 | Wen | G06Q 20/32 | 705/44 |
| 2015/0235196 A1* | 8/2015 | Zhu | G06Q 20/20 | 705/17 |
| 2015/0254672 A1* | 9/2015 | Huesch | G06Q 20/4097 | 705/44 |
| 2015/0324766 A1* | 11/2015 | Park | G06Q 20/3572 | 705/39 |
| 2015/0332244 A1* | 11/2015 | Zhang | G06Q 20/02 | 705/39 |
| 2015/0339640 A1* | 11/2015 | Kim | G06Q 20/36 | 705/41 |
| 2016/0034862 A1* | 2/2016 | Amos | G06Q 20/401 | 705/39 |
| 2016/0048828 A1* | 2/2016 | Lee | G06Q 20/354 | 705/39 |
| 2016/0086158 A1* | 3/2016 | Yu | G06O 20/401 | 705/44 |
| 2016/0092856 A1* | 3/2016 | Lee | G06Q 20/145 | 705/39 |
| 2016/0117683 A1* | 4/2016 | Jung | G06Q 20/3226 | 705/44 |
| 2016/0125486 A1* | 5/2016 | Kasai | G06Q 30/04 | 705/40 |
| 2017/0011366 A1* | 1/2017 | Pyo | G06Q 20/34 | |

FOREIGN PATENT DOCUMENTS

| | | |
|---|---|---|
| KR | 10-2010-0110418 A | 10/2010 |
| KR | 10-2011-0136301 A | 12/2011 |
| KR | 10-2014-0095148 A | 8/2014 |

* cited by examiner

FIG. 5

PAYMENT REQUESTER : YOCHEONG KIM
TOTAL AMOUNT TO BE COLLECTED : 150,000 WON

TIME 1 : BY 4:00 PM ON OCTOBER 30, 2015
AMOUNT 1 : 150,000 WON
COLLECTION ACCOUNT HOLDER : SUGUEM KIM
COLLECTION ACCOUNT : HANA BANK ###-###-##

TIME 2 : BY 4:00 PM ON NOVEMBER 6, 2015
AMOUNT 2 : 160,000 WON
COLLECTION ACCOUNT HOLDER : SUGUEM SHIN
COLLECTION ACCOUNT : WOORI BANK ###-###-##
KOOKMIN BANK ###-###-##

TIME 3 : BY 3:00 PM ON NOVEMBER 17, 2015
AMOUNT 3 : 170,000 WON
COLLECTION ACCOUNT HOLDER : SUGUEM PARK
COLLECTION ACCOUNT : WOORI BANK ###-###-##
KOOKMIN BANK ###-###-##

SUBJECT FROM WHOM TO COLLECT PAYMENT :
GILDONG HONG 010-####-####

| PAYMENT REQUESTER | PAYMENT COLLECTION INFORMATION OF PAYMENT RECIPIENT | | | | |
|---|---|---|---|---|---|
| | PAYMENT COLLECTION REQUEST TIME | AMOUNT TO BE COLLECTED | PAYMENT RECIPIENT | PAYMENT COLLECTION SCHEME INFORMATION | UNIQUE INFORMATION OF SUBJECT FROM WHOM TO COLLECT PAYMENT |
| YOCHEONG KIM | T1: 4:00 PM ON OCTOBER 3, 2015 | 150,000 WON | SUGUEM KIM | HANA BANK ###-###-## | GILDONG HONG |
| | T2: 4:00 PM ON NOVEMBER 6, 2015 | 160,000 WON | SUGUEM SHIN | WOORI BANK ###-###-##<br>KOOKMIN BANK ###-###-###-## | |
| | T3: 3:00 PM ON NOVEMBER 17, 2015 | 170,000 WON | SUGUEM PARK | WOORI BANK ###-###-##<br>KOOKMIN BANK ###-###-###-## | ... |
| ... | ... | ... | ... | ... | |

FIG. 7A

| TOTAL AMOUNT TO BE COLLECTED : 150,000 WON<br>S1: 4:00 PM ON OCTOBER 29, 2015<br>AMOUNT TO BE COLLECTED : 150,000 WON<br>COLLECTION ACCOUNT HOLDER : SUGUEM KIM<br>COLLECTION ACCOUNT : HANA BANK ###-####-## | | |
|---|---|---|
| EXECUTE REMITTANCE | | EXECUTE PROXY REMITTANCE |

FIG. 7B

| TOTAL AMOUNT TO BE COLLECTED : 150,000 WON<br>S1: 4:00 PM ON OCTOBER 29, 2015<br>AMOUNT OF REMITTANCE : 150,000 WON<br>COLLECTION ACCOUNT HOLDER : SUGUEM KIM<br>COLLECTION ACCOUNT : HANA BANK ###-####-## | | |
|---|---|---|
| EXECUTE REMITTANCE | EXECUTE PROXY REMITTANCE | ADD PAYMENT REMITTANCE RESERVED TIME |

FIG. 7C

| TOTAL AMOUNT TO BE COLLECTED : 150,000 WON<br>S1: 4:00 PM ON OCTOBER 29, 2015<br>AMOUNT OF REMITTANCE : 50,000 WON<br>COLLECTION ACCOUNT HOLDER : SUGUEM KIM<br>COLLECTION ACCOUNT : HANA BANK ###-####-##<br>S2: 10:10 AM ON NOVEMBER 5, 2015<br>AMOUNT OF REMITTANCE : 100,000 WON<br>COLLECTION ACCOUNT HOLDER : SUGUEM SHIN<br>COLLECTION ACCOUNT : WOORI BANK ###-####-##<br>                KOOKMIN BANK ###-####-## | | |
|---|---|---|
| EXECUTE REMITTANCE | EXECUTE PROXY REMITTANCE | ADD PAYMENT REMITTANCE RESERVED TIME |

FIG. 8

| REMITTANCE | | |
|---|---|---|
| ACCOUNT TRANSFER | CARD PAYMENT | MOBILE PHONE PAYMENT |

FIG. 9

| REMITTER : GILDONG HONG |||
|---|---|---|
| REMITTANCE ACCOUNT HOLDER : GILDONG HONG |||
| TOTAL AMOUNT OF REMITTANCE : 150,000 WON |||
| FIRST PAYMENT REMITTANCE RESERVED TIME : 4:00 PM ON OCTOBER 29, 2015 |||
| FIRST AMOUNT OF REMITTANCE : 150,000 WON |||
| FIRST REMITTANCE ACCOUNT : KOOKMIN BANK ###-####-## |||
| SECOND PAYMENT REMITTANCE RESERVED TIME : 10:10 AM ON NOVEMBER 5, 2015 |||
| SECOND AMOUNT OF REMITTANCE : 100,000 WON |||
| SECOND REMITTANCE ACCOUNT : WOORI BANK ###-####-## |||
| EXECUTE REMITTANCE | | CANCEL |

| REMITTER | REMITTER | TOTAL AMOUNT OF REMITTANCE | PAYMENT REMITTANCE RESERVED TIME | AMOUNT OF REMITTANCE | PAYMENT REMITTANCE SCHEME INFORMATION | EXECUTION ORDER | PAYMENT COLLECTION INFORMATION OF PAYMENT RECIPIENT |
|---|---|---|---|---|---|---|---|
| GILDONG HONG | REMITTANCE ACCOUNT HOLDER | 150,000 WON | 4:00 PM ON OCTOBER 29, 2015 | 50,000 WON | KOOKMIN BANK ###-###-## | S1 | T1 |
| | | | 10:10 AM ON NOVEMBER 5, 2015 | 100,000 WON | WOORI BANK ###-###-## | S2 | T2 |
| ... | ... | ... | ... | ... | ... | | |

METHOD OF REMITTING/RECEIVING PAYMENT USING MESSENGER SERVER

CROSS REFERENCE TO RELATED PATENT APPLICATIONS

This application claims the benefit under 35 U.S.C. Section 371, of PCT International Application No. PCT/KR2016/012627, filed Nov. 4, 2016 which claimed priority to Korean Patent Application No. KR 10-2015-0154269, filed Nov. 4, 2015 the disclosures of which are hereby incorporated by the references.

TECHNICAL FIELD

The present invention relates to a method of remitting and collecting payments using a messenger server, and more specifically, to a method of remitting and collecting payments using a messenger server, which enables a messenger server to be accessed even without the involvement of a card value added network (VAN)/payment gateway (PG) company, enables a payment remitter to specify in advance times at which payments of funds are to be executed, and enables payments to be made according to payment collection information on a payment recipient, from payment remittance information desired by the payment remitter.

BACKGROUND ART

In general, when a purchaser buys goods or services (hereinafter, collectively referred to as "products") of a seller, a payment method is a cash payment method, an account transfer payment method, a credit card payment method and a payment method through a telecommunication company, and the credit card payment method, which has many advantages, is commonly used.

A typical online credit card payment system is a method in which a card affiliated store requests a credit card company to approve a transaction through an online payment device, and a payment can be made only when the card affiliated store has a payment device connected to a credit card company online. Thus, when an order is made over a telephone at a remote place, credit card number and personal information need to be provided to the other party (i.e., card affiliated store), and hence there is a possibility of credit card theft.

In addition, since a conventional wireless credit card payment method uses a card payment device by connecting the card payment device to a wireless terminal, a seller must possess the wireless terminal and the card payment device at the time of delivery. In this case, since the seller requests a credit card company to approve the transaction through the wireless device via a wireless communication network, the seller needs to know a buyer's credit card information and thus there is still a concern of credit card theft.

Meanwhile, recently, a mobile credit card which is stored in a personal portable terminal, such as a mobile phone, has been introduced and used. In a payment system for purchasing and paying for a product using the mobile credit card, credit card information stored in a terminal of a card user is transmitted to a payment device of a card affiliated store, then the information is transferred to the credit card company through the Internet/gateway and a VAN system, and approval of payment for the product is made.

However, in such a credit card payment method, the credit card information of the card user is still transmitted to the credit card company through the card affiliated store, and hence, there is a concern of credit card theft. In addition, the card affiliated store must have a noncontact payment device for transmitting credit card information stored in the terminal of the card user to the credit card company. That is, there is no improvement in comparison to other credit card payment methods which use a general magnetic credit card or an IC card credit card.

Particularly, in the conventional payment methods, a VAN company or a PG company must intervene because credit card information or personal information of a requester who requests the payment is transmitted to the credit card company through the Internet/gateway and VAN system.

Accordingly, the payment requester is obliged to pay a certain amount to the VAN company or the PG company at the time of payment, and thus a payment method which can support payment without the involvement of the VAN company or the PG company is required.

In addition, among the above-described conventional payment methods, a method of remitting a payment to a payment recipient is inconvenient in that the payment recipient needs to open a new account when there is no account of the payment recipient.

Moreover, in the method of remitting a payment to a payment recipient, a collection bank to receive a payment, a collection account number, a collection account holder, an amount desired to be collected, and an appointed date for collection are designated by the payment recipient and a fixed amount must be remitted to the payment recipient without differentiating the amounts desired to be collected even when the remittance is made a week, fifteen days, or a month earlier than the appointed date of collection.

Accordingly, a payment remitter has wished to have an amount of payment differentiated in response to the remittance being made in advance before an appointed date of payment, and the payment recipient also needs to differentiate the amounts desired to be collected in regard to the remittance made after the appointed date.

Furthermore, the conventional method of remitting a payment to a payment recipient is inconvenient in that at the time of remittance to a payment recipient, a payment remitter individually needs to access a plurality of financial companies that the payment remitter is using and process the remittances, and timings for execution of corresponding funds cannot be set individually in advance.

Also, in the conventional method of remitting a payment to a payment recipient, when a payment remitter lacks funds for the amount to be collected, when the payment remitter does not want personal funds to be administered, or when there is no way for remitting an amount desired to be collected, a remittance method that enables a proxy remittance for all or part of the amount of collection is required.

DISCLOSURE

Patent Documentation 1: Korean Patent Registration No. 10-1501484 (Mar. 5, 2015) "Method of remitting/receiving payments using messenger server"

Patent Documentation 2: Korean Patent Registration No. 10-1212243 (Dec. 12. 2012) "Mobile credit card payment system and method"

Technical Problem

One objective of the present invention is directed to providing a method of remitting and collecting payments using a messenger server, which enables a messenger server to be accessed even without the involvement of a card value added network (VAN)/payment gateway (PG) company, enables a payment remitter to specify in advance times at which payments of funds are to be executed, and enables payments to be made according to payment collection information on a payment recipient, from payment remittance information desired by the payment remitter.

Technical Solution

According to one embodiment of the present invention, there is provided a messenger server including: a transmitting and receiving unit configured to receive payment collection request information including a payment requester, payment collection information of a payment recipient, and unique information of a subject from whom to collect payment and transmit the received payment collection request information to a payment remitter terminal that matches the unique information of the subject from whom to collect payment; an extracting unit configured to extract payment collection information of a payment recipient which is set for a payment collection request time that matches a payment remittance reserved time input from the payment remitter terminal or is closest following the payment remittance reserved time; and a payment remittance processing unit configured to receive, through the transmitting and receiving unit, payment remittance information of at least one payment remitter which includes a desired payment remittance reserved time for executing a payment remittance according to the payment collection information of the payment recipient extracted by the extracting unit, generate payment request information including payment remittance information of at least one payment remitter which has designated an execution order for executing payments according to the payment collection information of the payment recipient, and transmit the generated payment request information to a financial company or a telecommunication company.

The payment remittance information may include at least one payment remittance reserved time, at least one piece of payment remittance scheme information, and at least one amount of remittance and the payment remittance processing unit may transmit the payment request information to the financial company or the telecommunication company so that the amount of remittance is transferred according to the payment collection information of the payment recipient.

The payment remittance scheme information may be remittance account information, card information, or mobile phone information, the remittance account information may be an account number of a single financial company or include account numbers of different financial companies, the amount of remittance may be included in the payment collection information or be an amount divided from an amount of remittance included in the payment collection information, and the payment remittance reserved time may be a desired time at which to execute a remittance according to the payment collection information of the payment recipient.

The payment remittance processing unit may receive secret information for authentication for each of the at least one piece of payment remittance information and generates the payment request information.

The payment collection information of the payment recipient may include at least one among at least one payment collection request time, payment recipients for each of the at least one payment collection request time, an amount to be collected, collection account information, card information or mobile phone information according to a payment collection scheme, and payment collection identification information.

The extracting unit may determine a payment collection request time that matches the payment remittance reserved time input from the payment remitter terminal or is closest following the payment remittance reserved time on the basis of the payment collection request information, and extract payment collection information of a payment recipient set for the determined payment collection request time.

The transmitting and receiving unit may further include a proxy remittance processing unit configured to receive, from the payment remitter terminal, unique information of at least one proxy remitter which is designated and desired to execute a proxy remittance according to the payment collection information of the payment recipient, transmit the payment collection information of the payment recipient to a terminal of a proxy remitter which has unique information matching the unique information of the designated proxy remitter, receive payment remittance information of a proxy remitter desired to execute a proxy remittance according to the payment collection information of the payment recipient, and transmit payment request information generated according to the received payment remittance information to the financial company or the telecommunication company.

The proxy remittance processing unit may receive, from the payment remitter terminal, a requested amount of proxy remittance to be transferred by each of the at least one proxy remitter, which is designated by the payment remitter terminal, and generate payment collection information of a recipient of proxy remittance in which the requested amount of proxy remittance is reflected.

When a proxy remittance is re-requested by the proxy remitter terminal which has received the payment collection information of the recipient of proxy remittance, the proxy remittance processing unit may generate payment collection information of the recipient of the proxy remittance, in which the requested amount of proxy remittance or a requested amount of proxy remittance divided from the requested amount of proxy remittance is reflected, in at least one other proxy remittance terminal designated by the proxy remittance terminal.

The proxy remittance processing unit may notify a result regarding acceptance, refusal, or re-request for proxy remittance input from the proxy remitter terminal.

The proxy remittance processing unit may compare the requested amount of proxy remittance received from the payment remitter terminal with the requested amount of proxy remittance received from the proxy remitter terminal, and when the requested amount of proxy remittance received from the proxy remitter exceeds the requested amount of proxy remittance received from the payment remitter, notify the proxy remitter terminal of designation within the requested amount of proxy remittance received from the payment remitter terminal.

When account information is not included in the payment collection information of the payment recipient, the payment remittance processing unit may generate virtual account information for the payment recipient, provides the generated virtual account information to the payment recipient terminal, receive a password for withdrawal from the virtual account which is input from the payment remitter terminal, the messenger server, the payment recipient terminal, or a combination of at least two thereof, and transmit the virtual account information and the password to the financial company.

According to another embodiment of the present invention there is provided a method of remitting and receiving payment using a messenger server which is connected to a payment requester terminal which requests payment collection and a payment remitter terminal which requests remittance and relays remittance and collection of payment, the method including: receiving, by the messenger server, payment collection request information including a payment requester, payment collection information of a payment recipient, and unique information of a subject from whom to collect payment which are input from the payment requester terminal; transmitting, by the messenger server, the received payment collection request information to a payment remitter terminal that matches the unique information of the subject from whom to collect payment; receiving, by the messenger server, payment remittance information of at least one payment remitter which includes a desired payment remittance reserved time for executing a payment remittance according to the payment collection information of the payment recipient input from the payment remitter terminal; generating, by the messenger server, payment request information including payment remittance information of at least one payment remitter which has designated an execution order for executing payments according to the payment collection information of the payment recipient according to the payment remittance reserved time of the payment remittance information received from the payment remitter terminal; and transmitting the generated payment request information to a financial company or a telecommunication company.

The method may further include, after the transmitting of the generated payment request information, notifying the payment remitter terminal and the payment requester terminal of completion of remittance when the financial company or the telecommunication company completes the remittance according to an execution order of the payment request information.

The receiving of the payment remittance information may further include receiving secret information for authentication for each piece of payment remittance scheme information included in the payment remittance information and the generating of the payment request information may further include generating the payment request information including the secret information for authentication.

The payment collection information of the payment recipient may include at least one among at least one payment collection request time, payment recipients for each of the at least one payment collection request time, an amount to be collected, collection account information, and payment collection identification information and the receiving of payment remittance information may include: determining a payment collection request time that matches the payment remittance reserved time received from the payment remitter terminal or is closest following the payment remittance reserved time on the basis of the payment collection information of the payment recipient; and searching for payment collection information of the payment recipient set for the determined payment collection request time and providing the retrieved payment collection information to the payment remitter terminal.

The method may further include: after the transmitting of the received payment collection request information, receiving, from the payment remitter terminal, unique information of at least one proxy remitter which is designated and desired to execute a proxy remittance according to the payment collection information of the payment recipient; and transmitting payment collection information of a recipient of proxy remittance to a proxy remitter terminal which has unique information matching the unique information of the designated proxy remitter, wherein the receiving of the payment remittance information includes receiving payment remittance information of a proxy remitter desired to execute a proxy remittance according to the payment collection information of the payment recipient from the proxy remitter terminal.

The receiving of the unique information may include receiving, from the payment remitter terminal, a requested amount of proxy remittance to be transferred by each of the at least one proxy remitter, which is designated by the payment remitter terminal and the transmitting of the payment collection information of the recipient of proxy remittance may include generating payment collection information of the recipient of proxy remittance in which the requested amount of proxy remittance is reflected.

The receiving of the unique information may include, when a proxy remittance is re-requested by the proxy remitter terminal which has received the payment collection information of the payment recipient for the proxy remittance, receiving, by at least one other proxy remittance terminal designated by the proxy remittance terminal, the requested amount of proxy remittance or a requested amount of proxy remittance divided from the requested amount of proxy remittance.

The receiving of the unique information may include comparing the requested amount of proxy remittance received from the payment remitter terminal with the requested amount of proxy remittance received from the proxy remitter terminal, and when the requested amount of proxy remittance received from the proxy remitter exceeds the requested amount of proxy remittance received from the payment remitter, notifying the proxy remitter terminal of designation within the requested amount of proxy remittance received from the payment remitter terminal.

The method may further include, after the transmitting of the payment collection information of the recipient of proxy remittance, notifying a result regarding acceptance, refusal, or re-request for proxy remittance input from the proxy remitter terminal.

The method may further include: after the receiving of the payment collection request information, when collection account information is not included in the payment collection information of the payment recipient, generating virtual account information for the payment recipient; transmitting the generated virtual account information to the payment recipient terminal; receiving a password for withdrawal from the virtual account, which is input from the payment remitter terminal, the messenger server, the payment recipient terminal, or a combination of at least two thereof; and transmitting the virtual account information and the password to the financial company.

A computer readable recording medium, on which a computer program for executing the above method is recorded, is further provided.

Advantageous Effects

According to the embodiments of the present invention, a payment remitter accesses a messenger server and specifies in advance the execution times for executing funds without the involvement of a card value added network (VAN)/payment gateway (PG) company so that remittance can be made using payment remittance information desired by the payment remitter according to payment collection information of a payment recipient.

In addition, according to the embodiments of the present invention, at least one piece of payment request information which includes payment collection information of the payment recipient, at least one payment remittance reserved time, at least one piece of payment remittance scheme information, and at least one amount of remittance is transmitted to a financial company/telecommunication company so that an amount of remittance can be transmitted in a payment remittance scheme desired by the payment remitter.

Moreover, according to the embodiments of the present invention, when the payment remitter selects a payment remittance reserved time on the basis of payment collection information of a payment recipient which includes an amount to be collected set to be differentiated according to payment collection request times, a payment collection request time that matches the selected payment remittance reserved time or is closest following the payment remittance reserved time is determined and payment collection information of a payment recipient set for the determined payment collection request time is provided to the payment remitter terminal so that amounts to be collected are differentiated according to the payment collection request times and the differentiated amounts are remitted instead of a fixed amount of remittance, thereby meeting needs of the payment remitter and the payment recipient.

Furthermore, according to the embodiments of the present invention, at least one proxy remitter is designated to execute a proxy remittance according to payment collection information of a payment recipient and the designated proxy remitter is allowed to execute a proxy remittance to the payment collection information of the payment recipient so that the remittance to the payment collection information of the payment recipient can be smoothly performed even when a payment remitter is in an environment where remittance is not possible, the payment remitter does not want a direct remittance, or remittance account information has a smaller amount than the amount to be collected.

In addition, according to the embodiments of the present invention, a response result (acceptance, refusal, or re-request for proxy remittance) of the proxy remitter in response to proxy payment request information received by a proxy remitter terminal is provided to a requester who requests the proxy remittance so that it is possible to prepare a countermeasure for the amount to be remitted to the payment recipient.

Also, according to the embodiments of the present invention, when there is no collection account information of a payment recipient, virtual account information is generated and support for remittance to the generated virtual account information is provided so that the payment recipient without an account can collect payments.

DESCRIPTION OF DRAWINGS

FIG. 5 is a diagram illustrating an example of a payment collection request information input screen.

FIG. 6 is a diagram for describing a structure of the payment collection request information stored in a database.

FIGS. 7A to 7C are diagrams illustrating examples of a screen for selecting execution of remittance or proxy remittance according to payment collection information of a payment recipient.

FIG. 8 is a diagram illustrating an example of a screen for selecting a payment remittance scheme.

FIG. 9 is a diagram illustrating an example of a screen for describing information of a payment remitter which includes payment remittance scheme information input from the payment remitter terminal when an account transfer is selected as a payment remittance scheme in FIG. 8.

MODES OF THE INVENTION

Terminology used in the present invention is used only to describe specific embodiments and is not intended to limit the scope of the present invention. Further, the terminology used in the present invention is to be interpreted as is customary in the art to which the present invention belongs unless defined otherwise. It should be further understood that terms in common usage should also be interpreted as is customary in the relevant art and not in an idealized or overly formal sense unless expressly so defined herein. Further, when a term used in the present invention is an erroneous technical term which may not exactly express the concept of the present invention, it should be understood that the technical term is substituted by a term which those skilled in the art may understand. Further, the terminology used in the present invention should be interpreted according to that defined in the dictionary or according to the context, and is not to be interpreted in an overly reduced meaning.

In addition, elements of the present invention referred to in the singular may number one or more unless clearly indicated otherwise in the context. It should be further understood that the terms "comprises," "comprising," "includes," and/or "including," when used herein, specify the presence of stated components and/or operations but do not preclude the presence or addition of one or more other components and/or operations.

Hereinafter, exemplary embodiments will be described with reference to the attached drawings, and the same or similar elements regardless of drawing numbers will be given the same reference numbers, and overlapping descriptions thereof will be omitted.

Figure 1:
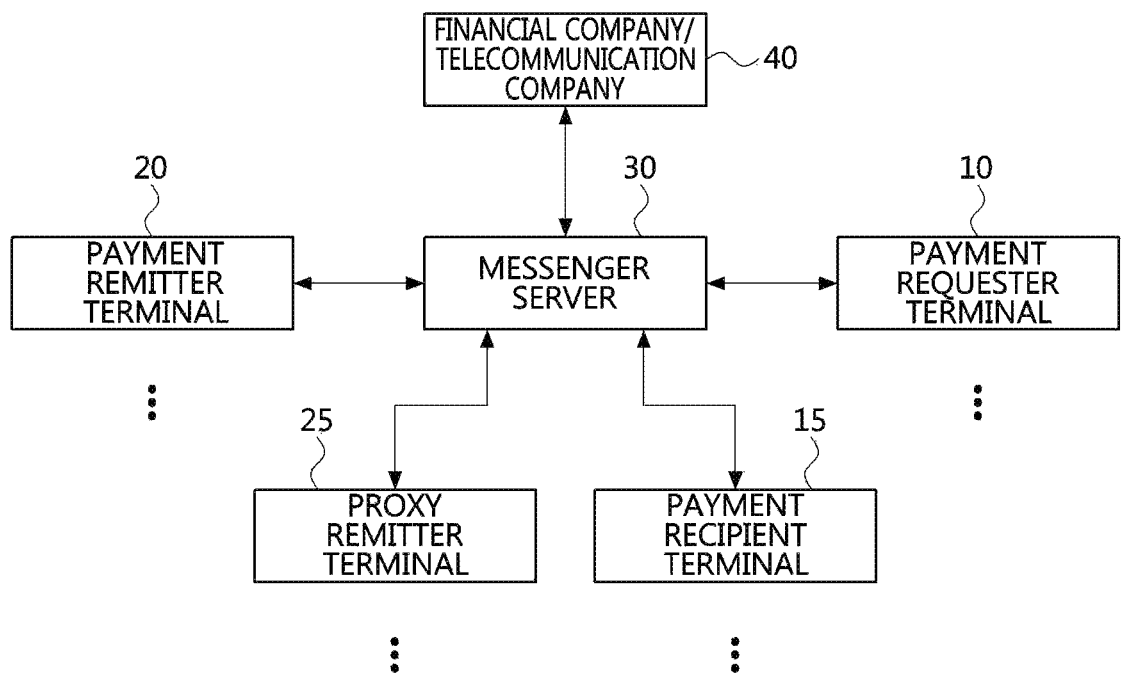
FIG. 1 is a block diagram for describing a system for remitting and collecting payments using a messenger server according to one embodiment of the present invention.
Figure 2:
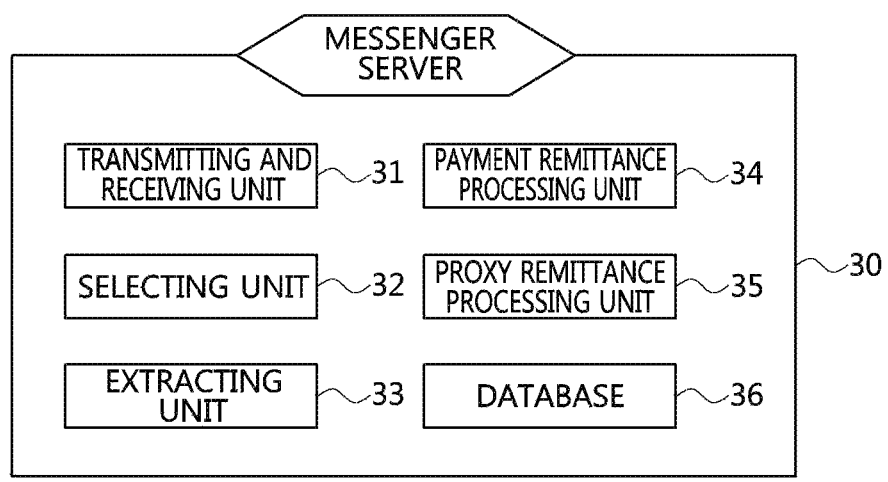
FIG. 2 is a block diagram for describing the messenger server shown in FIG. 1.

FIG. 1 is a block diagram for describing a system for remitting and collecting payments using a messenger server according to one embodiment of the present invention, and FIG. 2 is a block diagram for describing the messenger server illustrated in FIG. 1.

As shown in FIG. 1, the system for remitting and collecting payments using a messenger server of the present invention may include a payment requester terminal 10, a payment recipient terminal 15, a payment remitter terminal 20, a proxy remitter terminal 25, a messenger server 30, and a financial company/telecommunication company 40.

The payment requester terminal 10 may include a digital device allowing for accessing the messenger server 30 and communicating with the messenger server 30. The digital device may be an industrial server or a personal computer. Examples of the personal computer may include a desktop computer, a notebook computer, a workstation, a personal digital assistant (PDA), a web-pad, a mobile phone, and the like. In addition to the above examples, any digital device that has a memory device, and is equipped with a microprocessor and capable of computing may be employed as a digital device constituting the payment requester terminal 10 in accordance with the present invention.

The payment requester terminal 10 may input payment collection request information including a payment requester, payment collection information of a payment recipient, and specific information of a subject from whom to collect payment to the messenger server 30 using a messenger program. The payment requester may be different from the payment recipient and the unique information of the subject from whom to collect payment may be a mobile phone number.

The payment recipient terminal 15 may receive a notification related to a service for a payment collection request from the payment requester terminal 10, a notification related to a service for a payment request from the payment remitter terminal 20, or a notification related to a service for a proxy remittance request from the proxy remitter terminal 25 from the messenger server 30 without accessing the messenger server 30.

A communication network (not shown) is a network supporting communications between the messenger server 30 and the payment remitter terminal 20, between the messenger server 30 and the payment requester terminal 10, between the messenger server 30 and the payment recipient terminal 15, and between the messenger server 30 and the proxy remitter terminal 25. A configuration of underlying communication technology constituting the communication network has no substantial effect on the implementation of the present invention. In addition, the communication network may be configured regardless of a type of communication method such as a wired or wireless method.

The payment remitter terminal 20 may include a digital device allowing for accessing the messenger server 30 and communicating with the messenger server 30.

The payment remitter terminal 20 may receive payment collection request information of a payment recipient, select a desired remittance payment reserved time for executing payment remittance according to the received payment collection request information of the payment recipient, and request executing the payment remittance or proxy remittance according to the payment collection information of a payment recipient which is set for payment collection request time that matches the selected payment remittance reserved time or is closest following the selected payment remittance reserved time.

In this case, when the payment remittance reserved time is not received from the payment remitter terminal 20 for a predetermined period of time, the messenger server 30 may automatically select the earliest payment collection request time from one or more payment collection times when the payment recipient's payment collection information for each of a plurality of payment collection request times is set, and the messenger server 30 may transmit payment collection information of a payment recipient which is set for the corresponding payment collection request time to the payment remitter terminal 20 and request the payment remitter terminal 20 to execute the payment remittance or proxy remittance.

The remittance process may be requested by transmitting at least one piece of payment remittance information from the payment remitter terminal 20 to the messenger server 30, and the at least one piece of payment remittance information includes at least one payment remittance reserved time, at least one piece of payment remittance scheme information (remittance account information, card information, or mobile phone information), secret information for authentication of each payment remittance scheme information, and at least one amount of remittance.

The proxy remitter terminal 25 may include a digital device allowing for accessing the messenger server 30 and communicating with the messenger server 30.

When the proxy remitter terminal 25 receives a request for proxy remittance from the payment remitter terminal 20, the proxy remitter terminal 25 may select one among an acceptance, a refusal, and a re-request for proxy remittance according to the payment collection information of the payment recipient received from the payment remitter terminal 20.

A messenger program capable of transmitting messages to the messenger server 30 is installed in the above-described payment requester terminal 10, payment remitter terminal 20, and proxy remitter terminal 25. The program may be downloaded from the Internet or the like and installed freely without charge.

The messenger server 30 may be a server which provides functions of transmitting and receiving a variety of information including text, messages, emoticons, images, videos, website links, and the like between a plurality of terminals in which the messenger program is installed, and examples of the existing messenger services using such the messenger server may include Kakao Talk, Skype, NateOn messenger, and the like.

The present invention performs payment remittance and collection by communicating with the financial company/telecommunication company 40, which will be described below, based on information received from the terminals which have the messenger program installed therein and access the messenger server 30 to use the functions of the messenger server 30.

More specifically, the messenger server 30 performs functions of receiving the payment collection request information input from the payment requester terminal 10, selecting a subject from whom to collect payment to transmit the payment collection information of the payment recipient based on the received payment collection request information, transmitting the payment collection request information of the payment recipient to a terminal of a subject from whom to collect payment who has unique information matching unique information of the selected subject from whom to collect payment, i.e., the payment remitter terminal 20, extracting payment collection information of a payment recipient which is set for a payment collection request time that matches the payment remittance reserved time input from the payment remitter terminal 20 or is closest following the payment remittance reserved time, receiving payment remittance information of at least one payment remitter who has designated an execution order of executing payments according to the payment collection information of the payment recipient input from the payment remitter terminal that has received the extracted payment collection information of the payment recipient by receiving at least one piece of payment collection information, generating at least one piece of payment request information including the payment collection information of the payment recipient and the payment remittance information of the at least one payment remitter, transmitting the generated at least one piece of payment request information to the financial company/telecommunication company 40, and informing the payment recipient terminal 15 and the payment remitter terminal 20 of the progress of remittance in accordance with the payment collection request information of the payment recipient.

In response to the payment request information received from the messenger server 30, the financial company/telecommunication company 40 performs primary approval by comparing the possessed payment remittance scheme information (remittance account information, card information, or mobile phone information, and when a secondary approval is completed through the secret information included in the payment request information, the financial company/telecommunication company 40 may process the payment remittance or settlement and transmit information indicating the completion of the remittance or the settlement to the messenger server 30. It is clear that in addition to the account transfer, there is a change in the settlement amounts of card payment and the mobile phone payment according to the settlement reservation time in accordance with the payment collection information of the payment recipient.

Referring to FIG. 2, the messenger server 30 includes a transmitting and receiving unit 31, a selecting unit 32, an extracting unit 33, a payment remittance processing unit 34, a proxy remittance processing unit 35, and a database 36.

The messenger server 30 further includes a general messenger function, but descriptions of components related to the messenger function will be omitted.

The transmitting and receiving unit 31 transmits and receives transmission information and reception information transmitted and received to and from terminals having a communication connection through the messenger server 30.

The reception information includes payment request information input from a payment requester terminal 10 having a communication connection with the messenger server 30, a payment remittance reserved time input from a payment remitter terminal 20, information about at least one payment remitter input from the payment remitter terminal 20, request information for a payment remittance process or a proxy remittance process, payment remittance information of at least one payment remitter input from a proxy remitter terminal 25, payment remittance result information of a financial company/telecommunication company 40, and the like.

The transmission information includes payment collection information of a payment recipient to be transmitted to the payment remitter terminal 20, a payment recipient set to a payment collection request time, an amount to be collected and payment collection scheme information, payment request information to be transmitted to the financial company/telecommunication company 40, and the like.

In the present embodiment, the payment remitter terminal 20 receives payment collection request information input by the payment requester and payment remittance is made to the payment recipient, but the payment requester terminal 10 and the payment remitter terminal 20 which has received the payment collection request information, for example, through near-field communication (NFC), radio frequency identification (RFID), beacon, etc. from a payment device (not shown) installed in an affiliated store may remit the payment.

The selecting unit 32 selects a subject from whom to collect payment who has unique information that matches unique information of the subject from whom to collect payment which is included in the payment collection request information.

In addition, the selecting unit 32 transmits the payment collection request information of the payment recipient to the terminal of the selected subject, i.e., the payment remitter terminal 20, through the transmitting and receiving unit 31.

The extracting unit 33 determines a payment collection request time of the payment recipient that matches the payment remittance reserved time received from the payment remitter terminal 20 through the transmitting and receiving unit 31 or is closest following the payment remittance reserved time on the basis of the payment collection request information of the payment recipient, and extracts the payment recipient and the amount to be collected and payment collection scheme information from the set payment collection information of the payment recipient at the determined payment collection request time of the payment recipient.

In the present embodiment, the amount to be collected is described as the amount desired to be collected by a payment recipient that is set for a payment collection request time which matches the payment remittance reserved time or is closest following the payment remittance reserved time. However, when there is no payment collection request time matching the payment remittance reserved time, it is obvious to those skilled in the art that various methods for determining the amount desired to be collected, for example, a method of providing the amount desired to be collected which is determined by interpolation, in consideration of the amount desired to be collected between a payment collection request time that is the closest preceding the payment remittance reserved time and a payment collection request time that is closest following the payment remittance reserved time.

When the payment remitter terminal 20 which has received the payment collection information of the payment recipient extracted by the extracting unit 33 requests the payment remittance processing unit 34 to execute a payment remittance, the payment remittance processing unit 34 receives payment remittance information of at least one payment remitter that matches the payment collection information of the above-described payment recipient through a payment collection/remittance information input screen from the payment remitter terminal 20 via the transmitting and receiving unit 31 and generates payment request information including the extracted payment recipient, amount desired to be collected and payment collection scheme information, payment remittance reserved time, amount of remittance, payment remitter, and payment remittance scheme information, and the like.

In this case, the generated at least one piece of payment request information may have a function as a tradable security and is transmitted to the financial company/telecommunication company 40. Each of the pieces of payment request information may further include secret information for authentication input by the payment remitter terminal 20 and the secret information may be one of a one-time password (OTP), bio-information, and fingerprint recognition information.

When the payment remitter terminal 20 which has received the payment collection information of the payment recipient extracted by the extracting unit 33 requests the proxy remittance processing unit 35 to execute the proxy remittance, the proxy remittance processing unit 35 generates payment collection information of the payment recipient for proxy remittance by reflecting a desired proxy remitter to execute proxy remittance and a requested amount of proxy remittance, which is specified by the proxy remitter, in the payment collection information of the payment recipient.

The proxy remittance processing unit 35 transmits the generated payment collection information of the payment recipient for the proxy remittance to the proxy remitter, that is, the proxy remitter terminal 25, and provides a service enabling the proxy remitter terminal 25, which has received the payment collection information of the payment recipient for the proxy remittance, to execute the proxy remittance. In this case, the proxy remittance processing unit 35 may store unique information of the proxy remitter designated by the payment remitter terminal 20 in the database 36 in association with unique information of the payment remitter, i.e., the subject from whom to collect payment.

Particularly, when the proxy remitter terminal 25, which is requested to execute the proxy remittance, selects an acceptance of the proxy remittance, the proxy remittance processing unit 35 receives the payment remittance information (payment remittance scheme information, the amount of remittance, and the payment remitter) of the proxy remitter for the payment remittance, generates payment request information including the payment collection information of the payment recipient in which the amount of proxy remittance is reflected, and the payment remittance information of the proxy remitter, and transmits the payment request information to the financial company/telecommunication company 40.

In this case, the proxy remitter may select a payment remittance scheme through the above-described payment collection/remittance information input screen, accept the desired amount of remittance to be transferred in the selected payment remittance scheme, i.e., the whole of the requested amount of proxy remittance or some amount split from the requested amount of proxy remittance, and execute the remittance for the accepted amount.

In addition, when "re-request" for the proxy remittance is selected, the proxy remitter terminal 25 designates a secondary proxy remitter and the proxy remittance processing unit 35 transmits payment collection information of the payment recipient in which a requested amount of proxy remittance is reflected to the designated secondary proxy remitter.

In addition, when the "refusal" of the proxy remittance is selected, the payment remitter terminal 20 re-designates a proxy remitter and a requested amount of proxy remittance and the proxy remittance processing unit 35 transmits payment collection information of the payment recipient in which the re-designated requested amount of proxy remittance is reflected to the re-designated proxy remitter.

In this case, a notification unit (not shown) transmits information indicating the refusal of the proxy remittance to the payment remitter terminal 20 through the transmitting and receiving unit 31. Accordingly, the payment remitter is informed that the proxy remitter refuses the proxy remittance so that the payment remitter can promptly re-designate the proxy remitter and request the payment remitter terminal 20 to execute proxy remittance.

The notification unit may notify at least two of the payment requester, the payment recipient, the payment remitter, and the proxy remitter of the progress of payment collection/remittance by the payment collection information of the payment recipient included in the payment collection request information.

The messenger server 30 may store the payment collection information, which is input by the payment requester terminal 10 and shown in FIG. 5, in the database 36 having a structure shown in FIG. 6. The structure illustrated in FIG. 6 is merely an example and various structures may be used.

The payment collection information of the payment recipient includes at least one among payment collection requested time, the total amount to be collected, the payment recipient for each of the payment collection request times, the amount collected, and the payment collection scheme information. The payment collection scheme information includes payment collection account information, card information, mobile phone information, and payment collection identification information (e.g., affiliated store ID or the like). The total amount to be collected is the sum of all or parts of the amount desired to be collected which is set for each of the payment collection request times.

In FIG. 5, the total amount to be collected is the sum of the parts of the amount desired to be collected which is set for each of the payment collection request times, but, although not illustrated, the present invention may include another embodiment in which the total amount to be collected is the sum of all the amounts desired to be collected set for each of the payment collection request times.

There may be one or more payment collection request times, and different payment recipients may be set for the respective payment collection request times, different payment collection account information for the same payment recipient may be set for the payment collection request times, or different payment collection schemes of the same payment recipient may be set for the respective payment collection request times. Differential application may be used for the amounts desired to be collected set for the respective payment collection request times.

The payment collection account information includes a financial company for payment collection and a payment collection account number of the corresponding financial company, and the card information and the mobile phone information include the payment collection identification information. The payment collection account information is designated for each of the pieces of payment collection identification information so that when the card payment and the mobile phone payment are processed, payment can be collected in the payment collection account information on the payment date.

When there is no payment collection account information in the payment collection information of the payment recipient, the messenger server 30 may generate a virtual account number, receive a password for withdrawal from the virtual account number, which is set by the payment remitter terminal 20, the messenger server 30, the payment recipient terminal 15, or the combination of at least two thereof, store the received password in the database 36 by associating it with the payment collection information of the payment recipient, and transmit the virtual account number and the password to the financial company.

The messenger server 30 may further provide a notification to inform of the virtual account number through the payment collection/remittance input screen. Accordingly, the payment remitter is able to easily recognize that the payment collection account of the payment recipient is the virtual account number.

In addition, when, for example, the messenger server 30 requests a subject from whom to collect payment to pay an amount desired to be collected (e.g., 100,000 won) through a terminal installed at an affiliated store and the requested subject pays an amount of money (e.g., 150,000 won) more than the amount desired to be collected, the messenger server 300 may provide a service for returning the balance (e.g., 50,000 won) in cash.

A method of remitting and collecting payments using the messenger server having the above configuration will be described below with reference to FIGS. 3 and 4.

Figure 3:
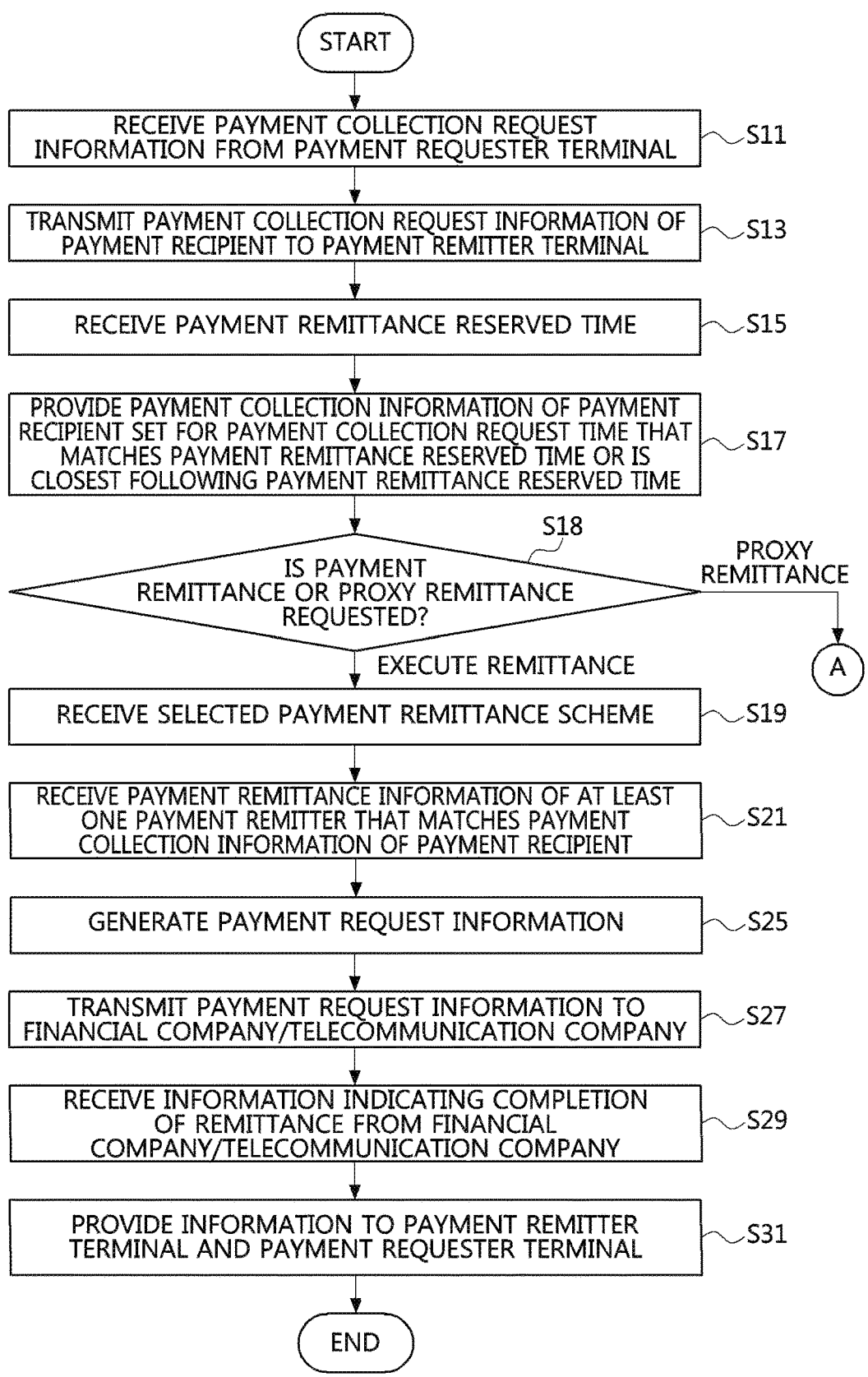
FIG. 3 is an operation flowchart for describing a method of remitting and collecting payments using a messenger server according to another embodiment of the present invention.
Figure 4:
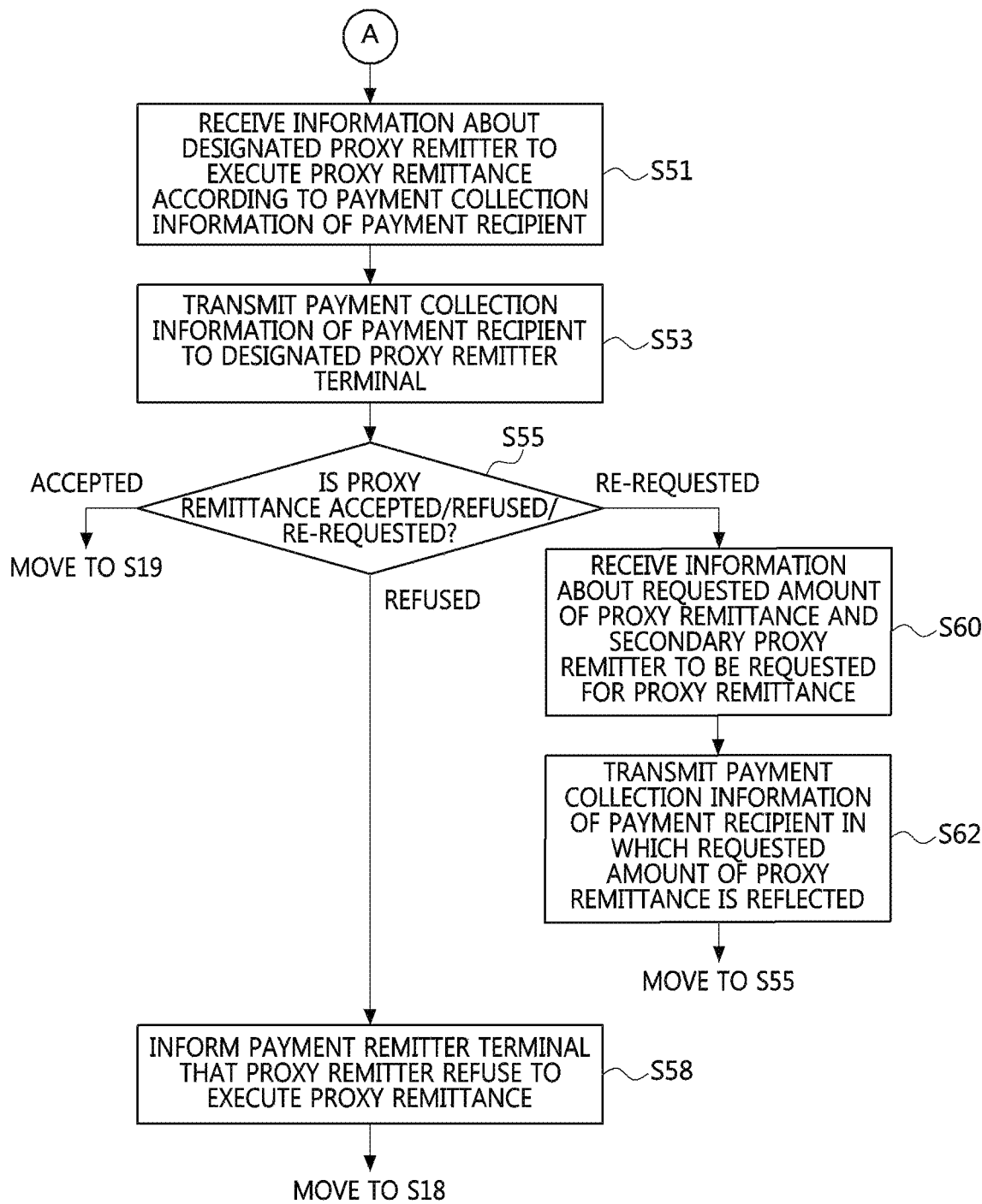
FIG. 4 is an operation flowchart for describing a method of remitting and collecting payments when a proxy remittance is requested by a payment remitter terminal in FIG. 3.

FIG. 3 is an operation flowchart for describing a method of remitting and collecting payments using a messenger server according to one embodiment of the present invention, and FIG. 4 is an operation flowchart for describing a method of remitting and collecting payments when proxy remittance is requested by a payment remitter terminal in FIG. 3.

Referring to FIG. 3, a messenger server 30 receives payment collection request information input from a payment requester terminal 10 in which a messenger program is installed, wherein the payment collection request information includes a payment requester, payment collection information of a payment recipient, and unique information of a payment collection target subject (S11).

The messenger server 30 stores and manages the received payment collection request information in a database 36. The payment collection information of the payment recipient and the payment requester are well illustrated in FIG. 5, and the payment requester may be different from the payment recipient. The payment recipient of the payment collection information may vary according to the payment collection request time. In addition, the payment recipient and the payment collection target subject, i.e., the payment remitter, may be the same. When the payment recipient and the payment remitter are the same, there is a transfer between the personal accounts of the payment recipient and thus such a procedure can be conveniently performed.

In this case, when the payment recipient is different from the payment collection requester or when payment collection account information is not included in the payment collection information, the messenger server 30 may receive a password set by the payment remitter terminal 20, the messenger server 30, the payment recipient terminal 15, or a combination of at least two thereof so that withdrawal from a generated virtual account can be made. Accordingly, a payment recipient without an account is allowed to receive the remittance.

The messenger server 30 transmits the payment collection request information of the payment recipient to a payment remitter terminal 20 that matches the unique information of the payment collection target subject received from the payment requester terminal 10 (S13).

Then, the messenger server 30 receives a desired payment remittance reserved time for executing the remittance on the basis of the payment collection request information input by the payment remitter terminal 20 in which a messenger program is installed (S15). A plurality of payment remittance reserved times may be input or selected by the payment remitter of the payment remitter terminal 20.

The messenger server 30 may determine a payment collection request time that matches the payment remittance reserved time or is closest following the payment remittance reserved time and is set in the payment collection information of the payment recipient, extract the payment collection information of the payment recipient set for the determined payment collection request time, and transmit the extracted payment collection information of the payment recipient, that is, the payment recipient and the amount desired to be collected and payment collection scheme information, to the payment remitter terminal 20 (S17).

For example, when the payment collection request times are by 4:00 pm on Oct. 30, 2015, by 4:00 pm on Nov. 6, 2015, and by 3:00 pm on Nov. 17, 2015 and the payment remitter selects 4:00 pm on Oct. 29, 2015 as the payment remittance reserved time, the payment recipient and the amount desired to be collected and payment collection scheme information in the payment collection information of a payment recipient which is set for the payment collection request time that is closest following the payment remittance reserved time, i.e., 4:00 pm on Oct. 30, 2015, are provided (refer to FIG. 7A).

FIG. 7A shows a case where the payment remitter selects 4:00 pm on Oct. 29, 2015 as the payment remittance reserved time, and illustrates a screen for requesting execution of the payment remittance or the proxy remittance according to the payment recipient and the amount desired to be collected and payment collection scheme information in the payment collection information of a payment recipient which is set for the payment collection request time closest following the selected payment remittance reserved time, i.e., 4:00 pm on Oct. 30, 2015.

The messenger server 30 determines whether the payment remitter terminal 20 requests execution of the payment remittance or the proxy remittance according to the payment collection information of the payment recipient through the above-described screen as shown in FIG. 7A (S18).

When the determination of operation S18 indicates that the payment remitter terminal 20 requests execution of the payment remittance according to the payment collection information of the payment recipient, the messenger server 30 may receive a payment remittance scheme for remitting the amount desired to be collected which is selected through a screen as shown in FIG. 8 for selecting the payment remittance scheme (S19).

One of an account transfer, card payment, and mobile phone payment may be selected as the payment remittance scheme. In addition, the payment remittance scheme may be differently selected according to each of the payment remittance reserved times.

Although in the present embodiment, the payment remittance scheme is selected from the account transfer, the card payment and the mobile phone payment, personal currency, such as a mobile card, electronic currency, or reward points, may be selected as the payment remittance scheme.

The messenger server 30 receives payment remittance information of at least one payment remitter that matches the payment collection information of the payment recipient input or selected by the payment remitter terminal 20 through a payment remittance/collection information input screen provided according to the selected payment remittance scheme (S21).

When payment collection information of a payment recipient for each of a plurality of payment collection request times is set, the messenger server 30 may receive the payment remittance information of the payment remitter who has specified an execution order for executing payments according to the payment remittance reserved times from the payment remitter terminal 20.

When the payment remitter terminal 20 requests the execution of a payment remittance through the screen of FIG. 7A, the messenger server 30 provides a remittance input screen for inputting the amount of remittance, as shown in FIG. 7B, and receives the amount of remittance matching the total amount desired to be collected or the amount of remittance calculated by dividing the total amount desired to be collected from the payment remitter terminal 20 through the provided remittance input screen.

Although FIG. 7B illustrates an example in which the execution of the payment remittance or the proxy remittance is requested by inputting the amount of remittance matching the total amount desired to be collected, the execution of the payment remittance or the proxy remittance may be requested by inputting the amounts of remittance for each of a plurality of payment remittance reserved times such that the amounts of remittance match the total amount desired to be collected.

When the account transfer is selected as the payment remittance scheme, the messenger server 30 receives payment remittance information of the payment remitter including payment remittance account information and secret information for authentication input by the payment remitter terminal 20. When the card payment is selected as the payment remittance scheme, the messenger server 30 receives payment remittance information of the payment remitter including the card information and secret information for authentication input by the payment remitter terminal 20. When the mobile phone payment is selected as the payment remittance scheme, the messenger server 30 receives payment remittance information of the payment remitter including mobile phone information and secret information for authentication input by the payment remitter terminal 20.

FIG. 9 illustrates an example in which the payment remittance information of the payment remitter is input by selecting an account transfer as a scheme for the payment remittance to the payment collection information of the payment recipient as shown in FIG. 8.

Although in the present embodiment it is described that a full amount is remitted for the total amount desired to be collected when the execution of payment remittance is requested, only part of the total amount desired to be collected may be remitted, the balance may be divided, and a plurality of proxy remitters may be requested to execute a proxy remittance.

The messenger server 30 generates payment request information including payment information of at least one payment remitter that matches the payment collection information of the payment recipient (S25). In this case, the messenger server 30 may perform an operation for receiving secret information for authentication for each of the pieces of payment remittance information of at least one payment remitter which is selected before the payment request information is generated. The secret information for authentication may be one of OTP, bio-information, and fingerprint recognition information, and the secret information may be input for each of the pieces of payment remittance information of at least one payment remitter.

Immediately after the above-described operation S25, the messenger server 30 informs a corresponding payment recipient and the payment collection requester of the progress of remittance.

The payment request information generated by the messenger server 30 is stored in a database 36. The payment request information may have a data structure shown in FIG. 11.

Figures 10, 11:
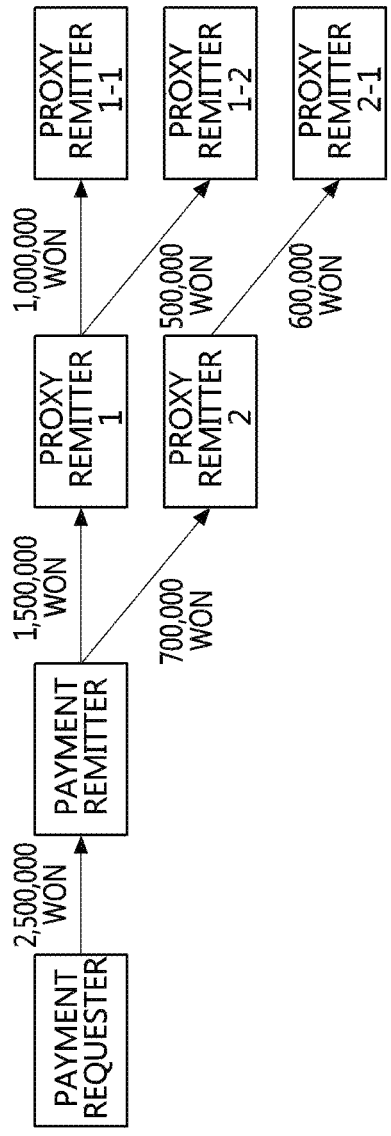
FIG. 10 is a diagram for describing a structure of payment request information stored in a database.
FIG. 11 is a diagram illustrating an example of a screen for describing a process of executing proxy remittances by dividing the amount of remittance when the proxy remittance is selected in FIG. 7.

The messenger server 30 may store the payment collection information of the payment recipient provided in the above-described operation S17 and the payment remittance information of the payment remitter shown in FIG. 10 in the database 36, in a structure shown in FIG. 11. In this case, the execution order for executing payments according to the payment remittance reserved times may be stored in the database 36 and identification information of the payment collection request time for identifying the payment collection request time in the payment collection request information may also be stored in the database 36. The payment collection request time identification information may be one of T1, T2, and T3 shown in FIG. 6.

The messenger server 30 transmits the generated payment request information to a financial company/telecommunication company 40 (S27). The messenger server 30 informs the payment requester terminal 10 and the payment recipient terminal 15 of the progress of remittance. At least one of various methods in addition to vibration, sound, and a combination thereof may be used to provide such notification.

At this time, it may be preferable that the messenger server 30 transmits the generated payment request information to the financial company/telecommunication company 40 so that remittances are executed according to the payment collection information of the payment recipient and according to the execution order which is set in accordance with the payment remittance reserved times.

Then, in response to the payment request information received from the messenger server 30, when the payment remittance is completed, the financial company/telecommunication company 40 transmits information indicating the completion of the remittance to the messenger server 30.

The messenger server 30 receives the information indicating the completion of the remittance from the financial company/telecommunication company 40 (S29) and informs the payment remitter terminal 20 and the payment requester terminal 10 of the completion of remittance (S31). When the payment requester is different from the payment recipient, the messenger server 30 also transmits information indicating the completion of the remittance to the payment recipient terminal 15.

In addition to the above-described information indicating the completion of the remittance, the messenger server 30 may receive status information about transactions of the personal account which are made not through the messenger server in consultation with a financial institution or the like.

In addition, the messenger server 30 may provide a common transmission/reception room for each of individual remittance/collection events so that remittance/collection information among subjects of the remittance/collection events can be collectively organized and shared.

In FIG. 4, when the determination of operation S18 indicates that the payment remitter terminal 20 requests execution of a proxy remittance according to the payment collection information of the payment recipient, the messenger server 30 is informed of a designated proxy remitter and a requested amount of proxy remittance through a designation screen by which the payment remitter terminal 20 designates the requested amount of proxy remittance and the proxy remitter to execute a proxy remittance according to the payment collection information of the payment recipient (S51). A plurality of proxy remitters may be designated. When a plurality of proxy remitters are designated, the payment remitter terminal 20, which requests the execution of a proxy remittance, may set the requested amount of proxy remittance for each of the proxy remitters.

In this case, the proxy remitters may be selected from a phone book stored in the payment remitter terminal 20 or the messenger server 30 or may be newly input, and a priority for the proxy remittance may be given to specific subjects. Specific subjects with high priorities, high frequencies of use, or high reputation scores can be preferentially placed on a list of subjects for proxy remittances, so that the payment remitter can conveniently select the proxy remitter.

The messenger server 30 transmits payment collection information of a payment recipient for the proxy remittance to the proxy remitter terminal 25 that matches unique information of the designated proxy remitter, wherein the payment collection information is generated by reflecting the requested amount of proxy remittance (S53).

The messenger server 30 determines whether the proxy remitter terminal 25 has selected one among the acceptance, the refusal, and the re-request for proxy remittance (S55).

When the determination result of operation S55 indicates that the proxy remitter terminal 25 has selected the acceptance of proxy remittance, the messenger server 30 moves to the above-described operation S19 and receives the payment remittance scheme selected by the proxy remitter terminal 25.

In this case, the messenger server 30 receives payment remittance information of the payment remitter which includes the payment remittance scheme information and the requested amount of proxy remittance or the amount of remittance smaller than the requested amount of proxy remittance from the proxy remitter terminal 25 through the payment remittance/collection information input screen provided according to the selected payment remittance scheme.

When the determination result of operation S55 indicates that the proxy remitter terminal 25 selects the refusal of proxy remittance, the messenger server 30 provides the payment remitter terminal 20 with information indicating the refusal of the proxy remittance (S58). Then, the messenger server 30 moves to the above-described operation S18.

The information indicating the refusal of the proxy remittance includes unique information of the proxy remitter. Accordingly, a requester who has requested the proxy remittance, i.e., the payment remitter, is able to recognize the refuser who refuses the proxy remittance and may designate another proxy remitter through the payment remitter terminal 20.

When the determination result of operation S55 indicates that the proxy remitter terminal 25 selects the re-request for the proxy remittance, the messenger server 30 receives information about a requested amount of proxy remittance and a secondary proxy remitter to be requested for the proxy remittance which are designated by the proxy remitter terminal 25 (S60). In this case, the messenger server 30 may provide the payment remitter terminal with information indicating that the all or part of the requested amount of proxy remittance is re-requested.

The messenger server 30 transmits, to a secondary proxy remitter terminal 25 designated by the proxy remitter terminal 25, payment collection information of the payment recipient for secondary proxy remittance which is generated by reflecting the requested amount of proxy remittance received from the proxy remitter terminal 25 (S62).

Then, the messenger server 30 moves to operation S55 for determining whether the secondary proxy remitter terminal 25 received by the proxy remitter terminal 25 has selected one among an acceptance, a refusal, and a re-request for proxy remittance.

The messenger server 30 informs the payment remitter terminal by transmitting a received response result regarding the acceptance, the refusal, and the re-request for proxy remittance of the proxy remittance. Accordingly, the payment remitter is enabled to easily identify the progress of proxy remittance.

FIG. 11 illustrates an example of a screen for describing a process of executing proxy remittances by dividing the amount of remittance when the proxy remittance is selected in FIG. 10.

Referring to FIG. 11, the messenger server 30 provides the payment remitter terminal 20 corresponding to the unique information of a payment collection target subject with information about the amount (2,500,000 won) desired to be collected which is included in the payment collection information of the payment recipient input by the payment requester of the payment requester terminal 10.

It is assumed that the payment remitter of the payment remitter terminal 20 requests proxy remittance for an amount of 2,200,000 won remaining from the amount desired to be collected, excluding a remittable amount (300,000 won).

The messenger server 30 has a proxy remitter 1 and a proxy remitter 2 designated by the payment remitter terminal 20 wherein the proxy remitter 1 is desired to execute a proxy remittance for a first requested amount of proxy remittance (1,500,000 won) and the second remitter 2 is desired to execute a proxy remittance for a second requested amount of proxy remittance (700,000 won).

The messenger server 30 has a secondary proxy remitter 1-1 and a secondary proxy remitter 1-2 designated by a terminal of proxy remitter 1, wherein the secondary proxy remitter 1-1 is desired to execute a proxy remittance for a requested amount of proxy remittance 1-1 (1,000,000 won) within the first requested amount or proxy remittance and the secondary proxy remitter 1-2 is desired to execute a proxy remittance for a requested amount of proxy remittance 1-2 (500,000 won). Also, the messenger server 30 has a secondary proxy remitter 2-1 designated by a terminal of the proxy remitter 2 wherein the secondary proxy remitter 2-1 is desired to execute a proxy remittance for a requested amount of proxy remittance 2-1 (600,000 won) within the second requested amount of proxy remittance.

The status of the proxy remittance request as described above is provided to the payment remitter terminal 20.

When the secondary proxy remitter 1-1, the secondary proxy remitter 1-2, and the secondary proxy remitter 2-1, which are designated for final proxy remittances request acceptance of proxy remittances, the messenger server 30 allows the corresponding requested amounts of proxy remittance to be transferred according to the payment collection information of the payment recipient.

The above-described embodiments of the present invention may be recorded in computer-readable media including program instructions to implement various operations by a computer. The media may also include, alone or in combination with the program instructions, data files, data structures, and the like. The media and program instructions may be those specially designed and constructed for the purposes of the present invention, or they may be of the type well-known and available to those having skill in the computer software arts. Examples of computer-readable media include magnetic media such as hard disks, floppy disks, and magnetic tape; optical media such as a compact disc read-only memory (CD ROM) and a digital versatile disc (DVD); magneto-optical media such as optical disks; and hardware devices that are specially configured to store and execute program instructions, such as a read-only memory (ROM), a random access memory (RAM), a flash memory, and the like. The media may also be a transmission medium such as optical or metallic lines, wave guides, etc. including a carrier wave transmitting signals specifying the program instructions, data structures, etc.

Examples of program instructions include both machine code, such as produced by a compiler, and files containing high level code that may be executed by the computer using an interpreter.

Although a few embodiments of the present invention have been shown and described, the present invention is not limited to the described embodiments. Instead, it should be appreciated by those skilled in the art that changes may be made to these embodiments without departing from the principles and spirit of the present invention, the scope of which is defined by the claims and their equivalents.

What is claimed is:

1. A messenger server comprising:
a transmitting and receiving unit configured to receive, from a payment requester terminal, payment collection request information including a payment requester, payment collection information of a payment recipient including an amount desired to be collected, and unique information of a subject from whom to collect payment and transmit the received payment collection request information, to a payment remitter terminal that matches the unique information of the subject from whom to collect payment; and
a payment remittance processing unit configured to receive, through the transmitting and receiving unit, payment remittance information of at least one payment remitter including an amount of payment remittance, generate payment request information including payment remittance information of at least one payment remitter, and transmit the generated payment request information of the payment remitter to a financial company or a telecommunication company,
wherein the generating payment request information includes secret information for authentication for each of the at least one piece of payment remittance information, and the secret information includes at least one of one-time password (OTP), bio-information, and fingerprint recognition information,
wherein the transmitting and receiving unit further includes a proxy remittance processing unit configured to receive, from the payment remitter terminal, unique information of at least one proxy remitter which is designated and desired to execute a proxy remittance according to the payment collection information of the payment recipient, transmit the payment collection information of the payment recipient to a proxy remitter terminal which has unique information matching the unique information of the designated proxy remitter, receive, from the proxy remitter terminal, payment remittance information of the proxy remitter desired to execute the proxy remittance according to the payment collection information of the payment recipient, and transmit payment request information of the proxy remitter, generated according to the received payment remittance information to the financial company or the telecommunication company,
wherein the proxy remittance processing unit receives, from the payment remitter terminal, a requested amount of proxy remittance to be transferred by each of the at least one proxy remitter, which is designated by the payment remitter terminal, and generates payment collection information of a recipient of proxy remittance in which the requested amount of proxy remittance is reflected,
wherein the payment collection information of the payment recipient includes at least one among at least one payment collection request time, a payment recipient for each of the at least one payment collection request time, an amount desired to be collected, collection account information, card information or mobile phone information according to a payment collection scheme, and payment collection identification information, and
wherein the messenger server further comprises an extracting unit configured to extract payment collection information of the payment recipient which is set for a payment collection request time that matches a payment remittance reserved time input from the payment remitter terminal or is closest following the payment remittance reserved time, wherein the extracting unit determines a payment collection request time that matches the payment remittance reserved time input from the payment remitter terminal or is closest following the payment remittance reserved time on the basis of the payment collection request information, and extracts payment collection information of a payment recipient set for the determined payment collection request time.

2. The messenger server of claim 1, wherein:
the payment remittance information includes at least one payment remittance reserved time, at least one piece of payment remittance scheme information, and at least one amount of remittance; and
the payment remittance processing unit transmits the payment request information to the financial company or the telecommunication company so that the amount of remittance is transferred according to the payment collection information of the payment recipient.

3. The messenger server of claim 2, wherein:
the payment remittance scheme information is remittance account information, card information, or mobile phone information;
the remittance account information is an account number of a single financial company or includes account numbers of different financial companies;
the amount of remittance is included in the payment collection information or is an amount divided from an amount of remittance included in the payment collection information; and
the payment remittance reserved time is a desired time at which to execute a remittance according to the payment collection information of the payment recipient.

4. The messenger server of claim 2, wherein the payment remittance processing unit receives secret information for authentication for each of the at least one piece of payment remittance information and generates the payment request information.

5. The messenger server of claim 1, wherein, when the proxy remittance is re-requested by the proxy remitter terminal which has received the payment collection information of the recipient of proxy remittance, the proxy remittance processing unit generates payment collection information of the recipient of the proxy remittance, in which the requested amount of proxy remittance or a requested amount of proxy remittance divided from the requested amount of proxy remittance is reflected, in at least one other proxy remittance terminal designated by the proxy remitter terminal.

6. The messenger server of claim 1, wherein the proxy remittance processing unit notifies a result regarding an acceptance, a refusal, or a rerequest for proxy remittance input from the proxy remitter terminal.

7. The messenger server of claim 1, wherein the proxy remittance processing unit compares the requested amount of proxy remittance received from the payment remitter terminal with the requested amount of proxy remittance received from the proxy remitter terminal, and when the requested amount of proxy remittance received from the proxy remitter exceeds the requested amount of proxy remittance received from the payment remitter, notifies the proxy remitter terminal of designation within the requested amount of proxy remittance received from the payment remitter terminal.

8. The messenger server of claim 1, wherein, when account information is not included in the payment collection information of the payment recipient, the payment remittance processing unit generates virtual account information for the payment recipient, provides the generated virtual account information to a payment recipient terminal, receives a password for withdrawal from the virtual account which is input from the payment remitter terminal, the messenger server, the payment recipient terminal, or a combination of at least two thereof, and transmits the information about the virtual account and the password to the financial company.

9. A method of remitting and receiving payment using a messenger server which is connected to a payment requester terminal which requests payment collection and a payment remitter terminal which requests remittance and relays remittance and collection of payment, the method comprising:
  receiving, by the messenger server, payment collection request information including a payment requester, payment collection information of a payment recipient including an amount desired to be collected, and unique information of a subject from whom to collect payment which are input from the payment requester terminal;
  transmitting, by the messenger server, the received payment collection request information to a payment remitter terminal that matches the unique information of the subject from whom to collect payment;
  receiving, by the messenger server, payment remittance information of at least one payment remitter which includes a desired payment remittance reserved time for executing a payment remittance according to the payment collection information of the payment recipient input from the payment remitter terminal;
  generating, by the messenger server, payment request information including payment remittance information of at least one payment remitter including an amount of payment remittance; and
  transmitting, by the messenger server, the generated payment request information of the payment remitter to a financial company or a telecommunication company,
  wherein the generating payment request information includes secret information for authentication for each of the at least one piece of payment remittance information, and the secret information includes at least one of one-time password (OTP), bio-information, and fingerprint recognition information,
  wherein after the transmitting of the received payment collection request information, the method further comprising:
  receiving, from the payment remitter terminal, unique information of at least one proxy remitter which is designated and desired to execute a proxy remittance according to the payment collection information of the payment recipient; and
  transmitting payment collection information of a recipient of proxy remittance to a proxy remitter terminal which has unique information matching the unique information of the designated proxy remitter,
  wherein the receiving of the payment remittance information includes receiving payment remittance information of a proxy remitter desired to execute a proxy remittance according to the payment collection information of the payment recipient from the proxy remitter terminal and transmitting payment request information of the proxy remitter generated according to the received payment remittance information to the financial company or the telecommunication company;
  wherein the receiving of the unique information includes receiving, from the payment remitter terminal, a requested amount of proxy remittance to be transferred by each of the at least one proxy remitter, which is designated by the payment remitter terminal, and the transmitting of the payment collection information of the recipient of proxy remittance includes generating payment collection information of the recipient of proxy remittance in which the requested amount of proxy remittance is reflected,
  wherein a sum of the requested amount of proxy remittance and the amount of payment remittance corresponds to the amount of desired to be collected, and
  wherein:
  the payment collection information of the payment recipient includes at least one among at least one payment collection request time, payment recipients for each of the at least one payment collection request time, an amount desired to be collected, collection account information, and payment collection identification information; and
  the receiving of the payment remittance information includes
  determining a payment collection request time that matches the payment remittance reserved time received from the payment remitter terminal or is closest following the payment remittance reserved time on the basis of the payment collection information of the payment recipient, and
  searching for payment collection information of the payment recipient set for the determined payment collection request time and providing the retrieved payment collection information to the payment remitter terminal.

10. The method of claim 9, further comprising, after the transmitting of the generated payment request information, notifying the payment remitter terminal and the payment requester terminal of completion of remittance when the financial company or the telecommunication company completes the remittance according to an execution order of the payment request information.

11. The method of claim 9, wherein:
  the receiving of the payment remittance information further includes receiving secret information for authentication for each piece of payment remittance scheme information included in the payment remittance information; and
  the generating of the payment request information further includes generating the payment request information including the secret information for authentication.

12. The method of claim 9, wherein the receiving of the unique information includes, when a proxy remittance is re-requested by the proxy remitter terminal which has received the payment collection information of the payment recipient for the proxy remittance, receiving, by at least one other proxy remitter terminal designated by the proxy remittance terminal, the requested amount of proxy remittance or a requested amount of proxy remittance divided from the requested amount of proxy remittance.

13. The method of claim 12, wherein the receiving of the unique information includes:
   comparing the requested amount of proxy remittance received from the payment remitter terminal with the requested amount of proxy remittance received from the proxy remitter terminal; and
   when the requested amount of proxy remittance received from the proxy remitter exceeds the requested amount of proxy remittance received from the payment remitter, notifying the proxy remitter terminal of designation within the requested amount of proxy remittance received from the payment remitter terminal.

14. The method of claim 12, further comprising, after the transmitting of the payment collection information of the recipient of proxy remittance, notifying a result regarding acceptance, refusal, or re-request for proxy remittance input from the proxy remitter terminal.

15. The method of claim 9, further comprising:
   after the receiving of the payment collection request information,
   when collection account information is not included in the payment collection information of the payment recipient, generating virtual account information for the payment recipient;
   transmitting the generated virtual account information to a payment recipient terminal;
   receiving a password for withdrawal from the virtual account, which is input from the payment remitter terminal, the messenger server, the payment recipient terminal, or a combination of at least two thereof; and
   transmitting the virtual account information and the password to the financial company.

16. A non-transitory computer readable recording medium on which a computer program for executing the method of claim 9 is recorded.

* * * * *